US008811872B2

(12) United States Patent
Nakagawa et al.

(10) Patent No.: US 8,811,872 B2
(45) Date of Patent: Aug. 19, 2014

(54) IMAGE HEATING APPARATUS, FILM USED FOR THE APPARATUS, AND MANUFACTURING METHOD OF FLEXIBLE RESIN MATERIAL FOR THE FILM

(75) Inventors: Ken Nakagawa, Yokohama (JP); Michio Uchida, Mishima (JP); Tomoo Akizuki, Yokohama (JP); Kazuhiro Doda, Yokohama (JP); Kensuke Umeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 13/409,654

(22) Filed: Mar. 1, 2012

(65) Prior Publication Data
US 2012/0230742 A1    Sep. 13, 2012

(30) Foreign Application Priority Data

Mar. 7, 2011   (JP) ................. 2011-048671
Feb. 23, 2012  (JP) ................. 2012-037701

(51) Int. Cl.
G03G 15/20        (2006.01)

(52) U.S. Cl.
USPC ........ 399/329; 399/333; 428/34.1; 428/36.91

(58) Field of Classification Search
USPC ........... 399/329; 264/331.19; 428/34.1, 36.91
See application file for complete search history.

(56) References Cited

U.S. PATENT DOCUMENTS

| 6,618,574 B2* | 9/2003 | Nishitani ................. 399/329 |
| 6,998,589 B2 | 2/2006 | Yano et al. |
| 7,177,579 B2 | 2/2007 | Uchida et al. |
| 7,283,763 B2 | 10/2007 | Akizuki et al. |
| 7,512,370 B2 | 3/2009 | Shimizu et al. |
| 8,247,043 B2 | 8/2012 | Tanaka et al. |
| 2003/0173356 A1* | 9/2003 | Yano et al. ................. 219/619 |
| 2009/0297972 A1 | 12/2009 | Sakimura et al. |
| 2011/0300316 A1 | 12/2011 | Tanaka et al. |
| 2012/0131980 A1* | 5/2012 | Yamamoto ................. 72/352 |

FOREIGN PATENT DOCUMENTS

| CN | 101650536 A | 2/2010 |
| CN | 102267301 A | 12/2011 |
| JP | 2001-341143 A | 12/2001 |
| JP | 2001341143 A * | 12/2001 |
| JP | 2003-233264 A | 8/2003 |
| WO | 2010/041718 A1 | 4/2010 |

OTHER PUBLICATIONS

NPL Marko Sedleck, Surface Topography Modeling for Reduced Friction, Mar. 8, 2011 Journal of Mechanical Engineering 57 (2011), vol. 9, pp. 674-680.*
Machine Translation of Jp 2001341143 A.*
Chinese Office Action dated Jun. 16, 2014, issued in counterpart Chinese Application No. 201210057746.7, and English-language translation thereof.

* cited by examiner

Primary Examiner — David Gray
Assistant Examiner — Francis Gray
(74) Attorney, Agent, or Firm — Fitzpatrick, Cella, Harper & Scinto

(57) ABSTRACT

An image heating apparatus, for heating, in a nip, a recording material for carrying a toner image while conveying the recording material, includes a flexible cylindrical film; a nip-forming member contacting an inner surface of the film; and a pressing member for forming the nip between itself and the film. The inner surface of the film is provided with a roughened surface portion in a region in which the nip-forming member slides on the inner surface of the film. The roughened surface portion has a skewness Rsk satisfying: Rsk<0.

15 Claims, 4 Drawing Sheets (a)

(b)

| | FILM INNER SURFACE | | | |
|---|---|---|---|---|
| | Rzjis(8-POINT AVERAGE) | Rsk(8-POINT AVERAGE) | SOUND PRESSURE(dB) | NOISE AT CA.3000Hz |
| EMB.1 | 2.5 | -0.05 | 37.7 | SMALL |
| EMB.2 | 4.3 | -0.05 | 37.5 | SMALL |
| EMB.3 | 5.8 | -0.28 | 37.9 | SMALL |
| EMB.4 | 7.5 | -0.08 | 37.8 | SMALL |
| EMB.5 | 9.7 | -0.4 | 37.1 | SMALL |
| EMB.6 | 12.5 | -0.3 | 37.6 | SMALL |
| EMB.7 | 15.9 | -0.1 | 38.1 | SMALL |
| COMP.EMB.1 | 3.2 | 0.22 | 39.7 | LARGE |
| COMP.EMB.2 | 5.4 | 0.49 | 39.9 | LARGE |
| COMP.EMB.3 | 9.8 | 0.3 | 39.3 | LARGE |
| COMP.EMB.4 | 17.2 | 0.15 | 39.5 | LARGE |

IMAGE HEATING APPARATUS, FILM USED FOR THE APPARATUS, AND MANUFACTURING METHOD OF FLEXIBLE RESIN MATERIAL FOR THE FILM

FIELD OF THE INVENTION AND RELATED ART

The present invention relates to an image heating apparatus mounted in an image forming apparatus of an electrophotographic type, such as a copying machine or a printer, and relates to a film used for the image heating apparatus and a manufacturing method of a flexible member used as an innermost layer of the film.

As a fixing device mounted in the electrophotographic copying machine or printer, the fixing device of a film heating type has been known. This fixing device of the film heating type includes a heater including a ceramic substrate and an energization heat generating resistor provided on the substrate, a fixing film movable while contacting the heater, and a pressing roller for forming a nip between itself and the fixing film contacting the heater. A recording material on which an unfixed toner image is carried is heated while being nip-conveyed through the nip, so that the image on the recording material is heat-fixed on the recording material. This fixing device has an advantage such that a time required for increasing a temperature thereof up to a fixable temperature from start of energization to the heater is short. Therefore, a printer in which the fixing device of this type is mounted can shorten a time (FPOT: first printout time) from an input of a print instruction until an image on a first sheet is outputted. Further, the fixing device of this type also has an advantage such that electric power consumption during a stand-by in which the fixing device awaits the print instruction is small.

In the fixing device of the film heating type, the fixing film rotates while contacting the heater and therefore a sliding resistance of the fixing film to the heater constitutes a driving load of the fixing film as it is. In order to reduce this driving load, it is very important that a dynamic frictional resistance between an inner peripheral surface (inner surface) of the fixing film and the heater is reduced. For example, by interposing a lubricant such as a heat-resistant lubricating grease between the inner surface of the fixing film and the heater, enhancement of a sliding property between the fixing film and the heater has been effected.

Further, in the film heating type fixing device mounted in a color printer, there is a need to melt superposed toner images of multiple colors and therefore a toner amount per unit area of the color toner images is two times or more that of a monochromatic toner image in some cases. In order to smoothly fix the color toner images with a large toner amount per unit area, there is a need to fix the toner images on the recording material under application of heat at a high temperature.

Thus, with demands for a color image and improvement of productivity in recent years, the fixing film of the fixing device has been frequently used in an environment of a higher temperature and a hither pressure. As a result, the sliding resistance of the fixing film is liable to increase due to abrasion (wearing) of the fixing film and a viscosity deterioration of the lubricating grease.

Further, in the film heating type fixing device, a shortage of the lubricating grease at the inner surface of the fixing film is caused by continuous use of the fixing film at a high temperature, so that the abrasion of the fixing film rapidly progresses in some cases. As a result, a slip such that the fixing film is temporarily stopped can occur to cause image defect. Further, when the slip of the fixing film occurs, a jam can occur. Even in the case where the slip of the fixing film does not occur, when the fixing device is operated at a low speed and at a high temperature, a shuddering noise is generated by stick-slip such that the fixing film periodically repeats stop and sliding relative to the heater. Particularly, in the case of a color printer for which a high glossiness of an image is required in some instances, the fixing device fixes the image under a higher pressure and therefore the above-described stick-slip is liable to occur.

In order to address this problem, Japanese Laid-Open Patent Application (JP-A) 2001-341143 and JP-A 2003-233264 disclose that an inner surface of a film member of a film heating type fixing device is roughened to decrease a contact area between the film member and a heating member or a guide member, thus alleviating a frictional resistance.

The inner peripheral surface (inner surface) of the above-described surface-roughened film member (hereinafter referred to as a fixing film) contacts the heater or a filming guide for supporting the heater and for guiding the inner surface of the fixing film. The heater surface sliding on the inner surface of the fixing film is subjected to coating with glass or polyimide, so that the heater surface is configured to obtain a good sliding property with respect to the inner surface of the fixing film.

On the other hand, the surface of the film guide which slides on the inner surface of the fixing film has a surface roughness larger than that of the heater surface. When the surface of such a film guide slides on the roughened inner surface of the fixing film, vibration can be generated by friction between an uneven surface of the film guide and an uneven inner surface of the fixing film. Particularly, during nip-conveyance of a recording sheet (recording material) in the nip, an outer peripheral surface (surface) of the fixing film contacts the recording sheet (paper). For this reason, the above-described vibration transmits from the fixing film to the recording sheet to result in a large sliding noise, thus increasing an operating noise of the fixing device. The present inventors found this problem. It would be considered that this problem occurs due to a phenomenon that the recording sheet functions as cone paper of a speaker to transmit vibration, with a high frequency generated in the fixing film, to a large area of the whole surface of the recording sheet and thus the air is vibrated by the whole recording sheet and therefore the vibration is amplified as the sliding noise.

SUMMARY OF THE INVENTION

A principal object of the present invention is to provide an image heating apparatus capable of reducing a sliding noise when a nip-forming member such as a film guide or a heater slides on a fixing film roughened at an inner surface.

Another object of the present invention is to provide the fixing film used for the image heating apparatus and a manufacturing method of a cylindrical flexible resin material used as an innermost layer of a film for a fixing device.

According to an aspect of the present invention, there is provided an image heating apparatus for heating, in a nip, a recording material for carrying a toner image while conveying the recording material, the image heating apparatus comprising: a flexible cylindrical film; a nip-forming member contacting an inner surface of the film; and a pressing member for forming the nip between itself and the film, wherein the inner surface of the film is provided with a roughened surface portion in a region in which the nip-forming member slides on the inner surface of the film, and wherein the roughened surface portion has a skewness Rsk satisfying: Rsk<0.

According to another aspect of the present invention, there is also provided a flexible cylindrical film used for an image heating apparatus for heating a recording material on which a toner image is carried, the film comprising: a roughened surface portion, provided at an inner surface of the film, having a skewness Rsk satisfying: Rsk<0.

According to a further aspect of the present invention, there is provided an manufacturing method of a cylindrical flexible resin material used as an innermost layer of a film for an image heating apparatus for heating a recording material on which a toner image is carried, the manufacturing method comprising: applying a precursor solution of the flexible resin material onto a surface of a cylindrical mold provided with a roughened surface portion having a skewness Rsk satisfying: Rsk<0; and heating the precursor to undergo conversion to obtain the cylindrical flexible resin material.

According to the present invention, it is possible to reduce a sliding noise due to sliding of a nip-forming member such as a heater or a film guide on an inner surface of a fixing film when the inner surface of the fixing film is roughened.

These and other objects, features and advantages of the present invention will become more apparent upon a consideration of the following description of the preferred embodiments of the present invention taken in conjunction with the accompanying drawings.

Figure 3:
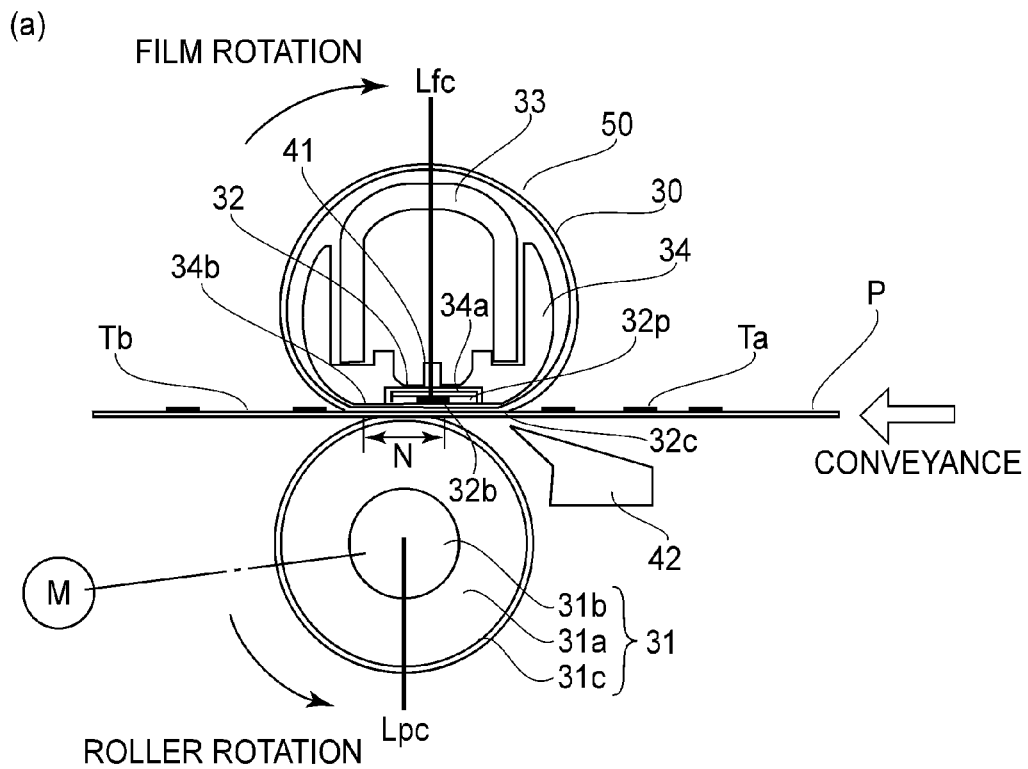
Figure 3:
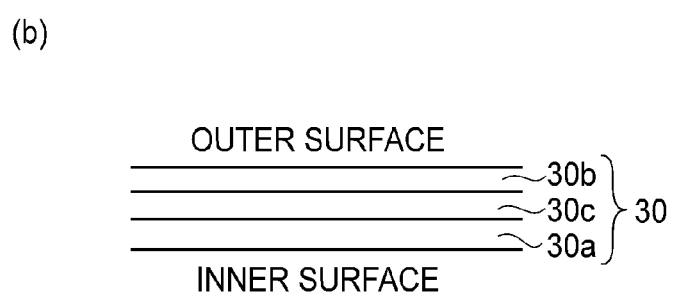

Part (a) of FIG. 3 is a sectional view showing a schematic structure of the fixing device according to the embodiment, and (b) of FIG. 3 is a sectional view showing a layer structure of a fixing film for the fixing device according to the embodiment.

Figures 4, 5:
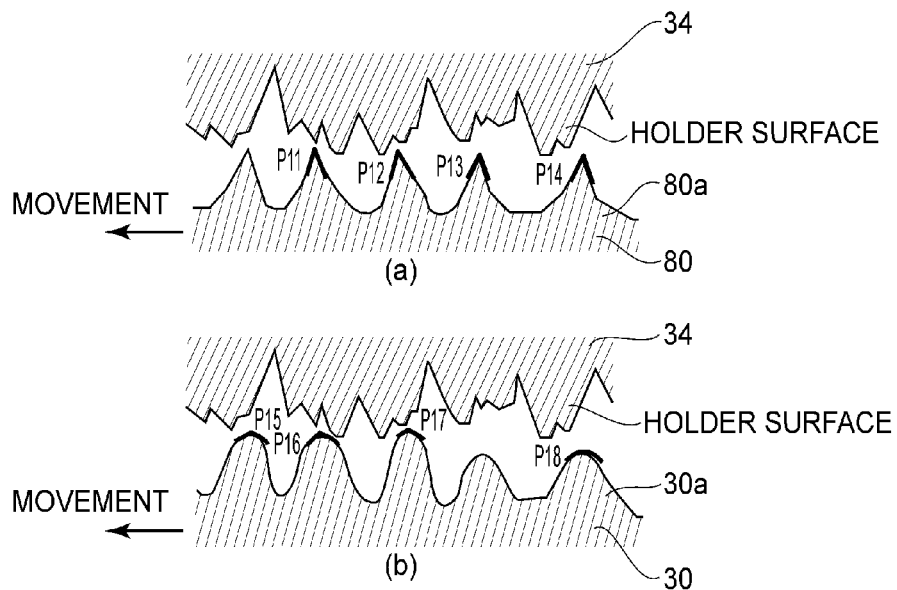

Part (a) of FIG. 4 is a schematic sectional view showing a heater holder and a fixing film in Comparative Embodiment in which an inner surface of a base layer of the fixing film satisfying Rsk>0, and (b) of FIG. 4 is a schematic sectional view showing a heater holder and a fixing film in an embodiment of the present invention in which an inner surface of a base layer of the fixing film satisfying Rsk<0.

FIG. 5 is a table showing a result of measurement of a sliding noise when a recording material is conveyed through a fixing device using a fixing film in each of Embodiments 1-7 and Comparative Embodiments 1-4.

Figure 6:
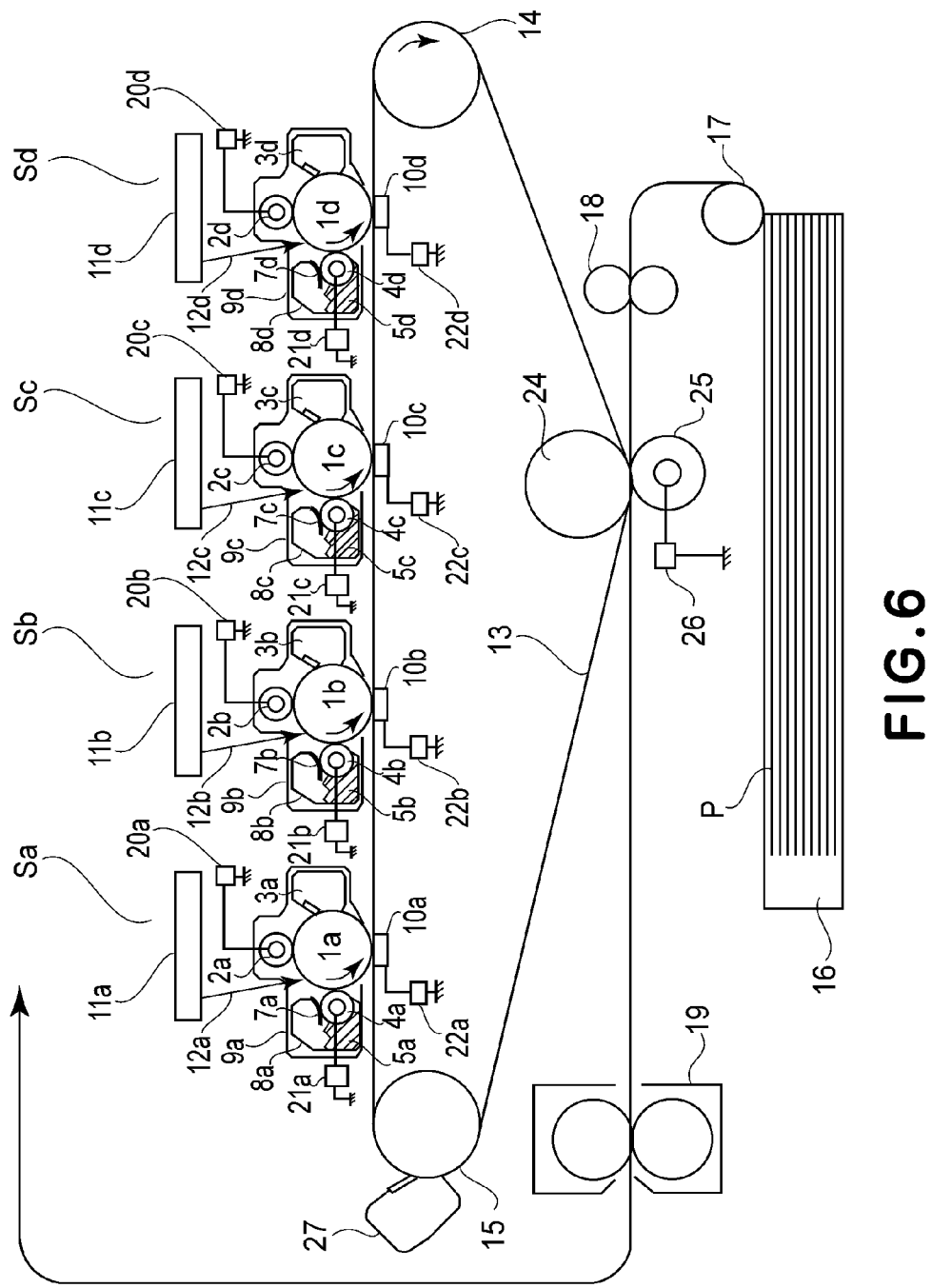

FIG. 6 is a schematic view of an image forming apparatus in which the fixing device according to the embodiment.

DESCRIPTION OF THE PREFERRED EMBODIMENTS

Embodiment (1) Image Forming Apparatus

FIG. 6 is a schematic view of an image forming apparatus in which an image heating apparatus according to this embodiment is mounted as a fixing device (fixing apparatus). This image forming apparatus is a color laser beam printer using an electrostatic photographic process.

The image forming apparatus in this embodiment includes first to fourth image forming stations Sa, Sb, Sc and Sd as image forming portions disposed along a rotational direction of a rotatable intermediary transfer belt as a second image bearing member. In this embodiment, from an upstream side with respect to the rotational direction of the intermediary transfer belt 13, an image formation color of the first image forming station Sa is yellow (Y) and that of the second image forming station Sb is magenta (M). Further, an image formation color of the third image forming station Sc is cyan (C) and that of the fourth image forming station Sd is black (K).

The respective image forming stations Sa, Sb, Sc and Sd include drum-like electrophotographic photosensitive members as first image bearing members (hereinafter referred to as photosensitive drums) 1a, 1b, 1c and 1d and include charging rollers 2a, 2b, 2c and 2d as charging means, and the like. The respective image forming stations Sa, Sb, Sc and Sd include developing units 8a, 8b, 8c and 8d as developing means and cleaning units 3a, 3b, 3c and 3d, and the like. The developing units include developing sleeves 4a, 4b, 4c and 4d, non-magnetic one-component developers 5a, 5b, 5c and 5d, and developer-applying blades 7a, 7b, 7c and 7d, and the like. The non-magnetic one-component developers 5a, 5b, 5c and 5d are a yellow toner, a magenta toner, a cyan toner and a black toner, respectively. Further, the photosensitive drums 1a, 1b, 1c and 1d, the charging rollers 2a, 2b, 2c and 2d, the developing units 8a, 8b, 8c and 8d, and the cleaning units 3a, 3b, 3c and 3d are integrally assembled into process cartridges 9a, 9b, 9c and 9d, respectively. These process cartridges are detachably mounted in an image forming apparatus main assembly (not shown) constituting a casing of the image forming apparatus. Further, the respective image forming stations 8a, 8b, 8c and 8d include exposure means 11a, 11b, 11c and 11d and primary transfer members 10a, 10b, 10c and 10d, and the like. Each of the exposure means 11a, 11b, 11c and 11d includes a scanner unit or LED array for effecting scanning with laser light through a polygonal mirror. Further, each exposure means is constituted so that an outer peripheral surface (surface) of each of the photosensitive drums 1a, 1b, 1c and 1d is irradiated with each of scanning beams 12a, 12b, 12c and 12d modulated on the basis of an image signal inputted from an external device such as a host computer.

The intermediary transfer belt 13 is extended around and supported by three rollers as stretching members, i.e., a secondary transfer opposite roller 24, a driving roller 25 and a tension roller 15, so that a proper tension is maintained by the tension roller 15. The intermediary transfer belt 13 is disposed so that its outer peripheral surface (surface) contacts the four photosensitive drums 1a, 1b, 1c and 1d. By driving the driving roller 14, the intermediary transfer belt 13 is moved (rotated) in an arrow direction, relative to the photosensitive drums 1a, 1b, 1c and 1d, at the substantially same speed as those of the photosensitive drums 1a, 1b, 1c and 1d. Inside the intermediary transfer belt 13, the primary transfer members 10a, 10b, 10c and 10d are disposed so as to oppose the photosensitive drums 1a, 1b, 1c and 1d via the intermediary transfer belt 13. A secondary transfer roller 25 is disposed so as to oppose the secondary transfer opposite roller 24 via the intermediary transfer belt 13.

To the charging rollers 2a, 2b, 2c and 2d, charging bias power sources 20a, 20b, 20c and 20d as voltage supplying means to the charging rollers 2a, 2b, 2c and 2d are electrically connected, respectively. To the developing sleeves 4a, 4b, 4c and 4d, developing bias power sources 21a, 21b, 21c and 21d as voltage supplying means to the developing sleeves 4a, 4b, 4c and 4d are electrically connected, respectively. To the primary transfer members 10a, 10b, 10c and 10d, primary transfer power sources 22a, 22b, 22c and 22d as voltage supplying means to the primary transfer members 10a, 10b, 10c and 10d are electrically connected, respectively. To the secondary transfer roller 25, a secondary transfer power source 26 as a voltage supplying means to the secondary transfer roller 25 is electrically connected.

An image forming operation of the image forming apparatus in this embodiment will be described. In the image forming apparatus in this embodiment, depending on a print instruction, the photosensitive drums 1a, 1b, 1c and 1d of the first to fourth image forming stations Sa, Sb, Sc and Sd, the intermediary transfer belt 13 and the like are rotated in the arrow directions at predetermined process speeds.

In the first image forming station Sa, the charging roller 2a uniformly charges the surface of the photosensitive drum 1a to the negative polarity by a charging bias applied from the charging bias power source 20a (charging step). Then, on the charged surface of the photosensitive drum 1a, an electrostatic latent image depending on image information is formed by the scanning beam 12a from the exposure means 11a (exposure step). Next, the toner 5a in the developing unit 8a is charged to the negative polarity by the developer-applying blade 7a and then is applied onto the developing sleeve 4a. Then, the developing bias is applied from the developing bias power source 21a to the developing sleeve 4a, so that the photosensitive drum 1a is rotated and thus the electrostatic latent image formed on the surface of the photosensitive drum 1a reaches the developing sleeve 4a. Then, the electrostatic latent image is visualized (developed) by the negative (-polarity) toner, so that the toner image of yellow for a first color is formed on the photosensitive drum 1a surface (developing step).

Also in the second to fourth image forming stations Sb to Sd, similarly as in the first image forming station Sa, an image forming process including the charging step, the exposure step and the developing step is performed. As a result, the toner images of magenta for second color, cyan for a third color, and black for a fourth color are formed on the surfaces of the photosensitive drums 1b, 1c and 1d of the second, third and fourth image forming stations Sb, Sc and Sd, respectively.

The respective color toner images on the surfaces of the photosensitive drums 1a-1d are successively transferred superposedly onto the surface of the intermediary transfer belt 13 by the primary transfer members 10a-10d (transfer step). As a result, unfixed toner images of four colors for a full-color image are carried on the intermediary transfer belt 13 surface.

A residual matter such as a transfer residual toner remaining on the surfaces of the photosensitive drums 1a-1d after the transfer of the toner images is removed by the cleaning units 3a-3d. As a result, the surfaces of the photosensitive drums 1a-1d are subjected to subsequent image formation.

On the other hand, in synchronism with formation of the electrostatic latent image by the exposure, the recording material P such as recording sheets stacked and accommodated in a sheet-feeding cassette 16 is picked up by a sheet-feeding roller 17 and is conveyed to a registration roller 18 by unshown conveying rollers. This recording material P is conveyed by the registration roller 18 to a transfer portion, formed by the intermediary transfer belt 13 and the secondary transfer roller 25, in synchronism with the toner images on the intermediary transfer belt 13. Then, this recording material P is nip-conveyed, at the transfer portion, by the outer peripheral surface (surface) of the intermediary transfer belt 13 and the outer peripheral surface (surface) of the secondary transfer roller 25. During this conveying process, to the secondary transfer roller 25, a transfer bias of an opposite polarity to the toner charge polarity is applied from the secondary transfer power source 26. As a result, four color (multiple) toner images carried on the surface of the intermediary transfer belt 13 (hereinafter, these toner images are referred to as toner images) are secondary-transferred collectively onto the recording material P.

The recording material P on which the unfixed toner images of four colors is guided into a fixing nip (nit portion), described later, as an image heating portion (fixing portion) of a fixing device 19. Then, by passing the recording material P through this fixing nip, the toner images are subjected to heat and pressure to be heat-fixed on the recording material P. This recording material P is conveyed from the fixing device 19 to a discharge tray (not shown) of the image forming apparatus, thus being discharged as an image-formed product (print or copy).

After the secondary transfer, a transfer residual toner remaining on the surface of the intermediary transfer belt 13 and paper powder transferred from the recording material P onto the surface of the intermediary transfer belt 13 are removed and collected by a belt cleaning means 27 contacted to and disposed on the surface of the intermediary transfer belt 13. In the belt cleaning means 27, an elastic cleaning blade formed with an urethane rubber or the like is used to remove the transfer residual toner, the paper power and the like.

(2) General Structure of Fixing Device

In the following description, with respect to the fixing device and members constituting the fixing device, a longitudinal direction refers to a direction perpendicular to a recording material conveyance direction. A widthwise direction refers to a direction parallel to the recording material conveyance direction. A width refers to a dimension with respect to the widthwise direction.

Figure 1:
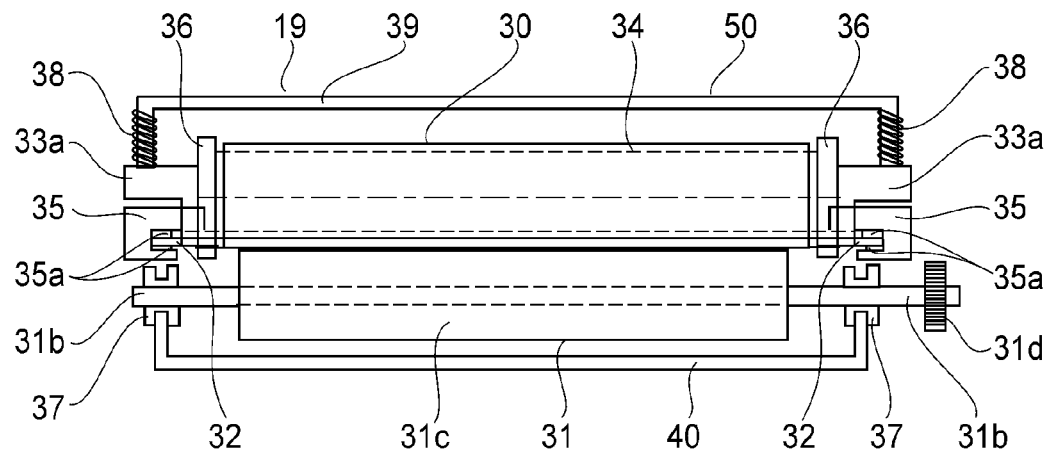
FIG. 1 is a schematic view of a fixing device according to an embodiment as seen from a recording material introducing side.
Figure 2:
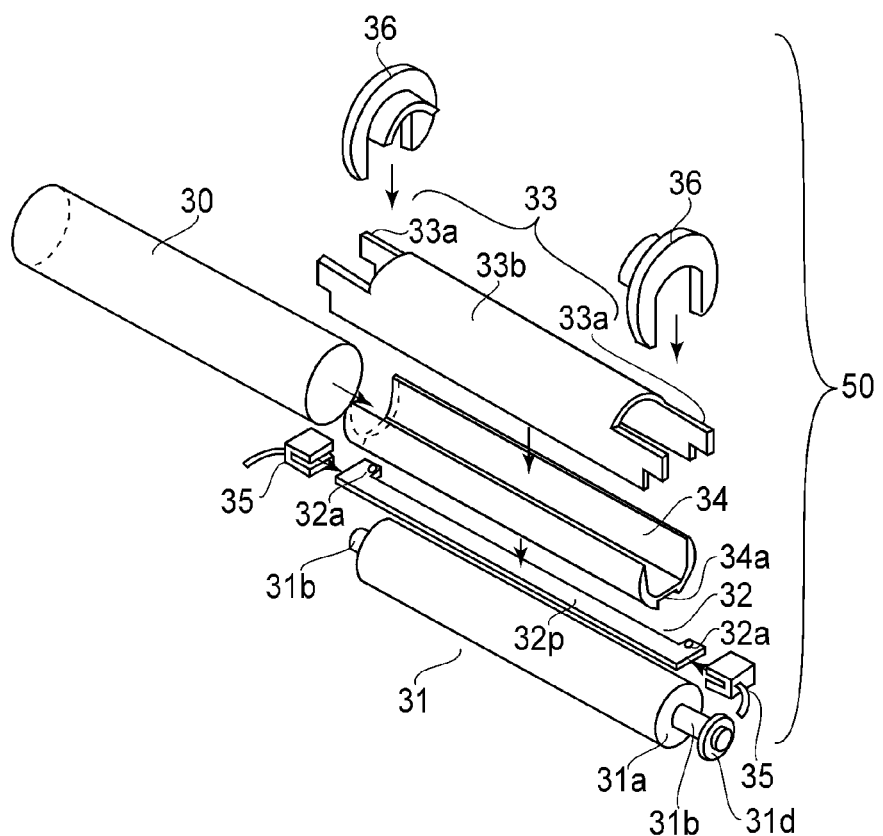
FIG. 2 is a perspective view showing a schematic structure of the fixing device according to the embodiment.

FIG. 1 is a schematic view of the fixing device 19 as seen from a recording material guide side. FIG. 2 is a perspective view of the fixing device 19. Part (a) of FIG. 3 is a sectional view showing a schematic structure of the fixing device 19, and (b) of FIG. 3 is a sectional view showing a layer structure of a fixing film for the fixing device 19. This fixing device 19 is of the film heating type of a tension-less type. The fixing device 19 of this type uses, as the fixing film, a heat-resistant film in an endless belt shape or a cylindrical shape. Further, at least a part of a circumference of the fixing film is in a tension free state (in which no tension is applied), so that the fixing film is constituted so as to be rotated by a rotational driving force of a pressing roller.

The fixing device 19 in this embodiment includes a heater assembly unit 50, a pressing roller (pressing member) 19, and the like. The heater assembly unit 50 is an assembled member including a fixing film (flexible member) 30, a ceramic heater (heating member) 32, a rigid stay (reinforcing member) 33, a heater holder (heating member-supporting member) 34, a regulating flange (regulating member) 36 and the like. Each of the fixing film 30, the ceramic heater (hereinafter referred to as a heater) 32, the rigid stay 33, the heater holder 34 and the pressing roller 19 is a long member extending in the longitudinal direction.

In the heater assembly unit 50, the heater holder 34 is formed in a substantially tub-like shape in cross section. At an upper central surface of this heater holder 34 with respect to the widthwise direction, the rigid stay formed in a reversed U-shape in cross section is provided along the longitudinal direction of the heater holder 34. The heater 32 is supported by a heater receiving groove 34a provided along the longitudinal direction at a lower central surface of the heater holder 34 with respect to the widthwise direction. A thermistor (temperature detecting member) 41 ((a) of FIG. 3) is disposed so as to contact the heater 32 at a substantially central portion with respect to the longitudinal direction of the heater holder 34 and at an upper central surface with respect to the widthwise direction. With the heater holder 34 including the rigid stay 33, the heater 32 and the thermistor 41, the cylindrical fixing film 30 is externally engaged loosely. With respect to the longitudinal direction of the fixing film 30, at a projected portion 33a of the rigid stay 33 projected from each of end surfaces of the fixing film 30, the regulating (preventing) flange 36 (regulating (preventing) member) 36 for regulating (preventing) movement of the fixing film 30 in the longitudinal direction is provided. A distance between inner surfaces of the regulating flanges 36 provided at the projected portions 33a at both sides of the rigid stay 33 with respect to the longitudinal direction is set so as to be longer than a length of the fixing film 30. This is because the longitudinal end portions of the fixing film 30 are prevented from being damaged during normal use of the fixing film 30 in which the fixing film 30 is rotated without being moved in the longitudinal direction. In the thus-assembled heater assembly unit 50, the regulating flanges 36 at both sides of the fixing film 30 with respect to the longitudinal direction are supported by a top plate-side casing 39 shown in FIG. 1 via a bracket (not shown).

Each of the respective members of the heater assembly unit 50 will be described more specifically. The heater 32 includes an elongated heater substrate 32a formed of ceramic such as alumina or aluminum nitride. On the surface of the heater substrate 32a at the fixing film 30 side, an energization heat generating resistor 32b ((a) of FIG. 3) and an energy supplying electrode 32a (FIG. 2) are printed in a pattern. To the energy supplying electrode 32a (FIG. 2) provided at each of both longitudinal sides of the heater substrate 32p, an energy supplying connector 35 is electrically connected, so that energy is supplied from the energy supplying connector 35 to the energization heat generating resistor 32b via the energy supplying electrode 32a. At the surface of the heater substrate 32p contacting the inner peripheral surface (inner surface) of the fixing film 30, a glass coat layer 32c for protecting the energization heat generating resistor 32b is provided. The glass coat layer 32c is harder than the fixing film 30 in general. For that reason, when a degree of unevenness of the surface of the glass coat layer 32c (the heater surface) contacting the inner surface of the fixing film 30 is large, the glass coat layer 32c abrades the inner surface of the fixing film 30, so that slip is liable to occur. Therefore, the surface of the glass coat layer 32c may preferably be close to a mirror surface to the extent possible and may more preferably have a surface roughness Rzjis of 1 μm or less.

The heater holder (film guide) 34 functions as not only a supporting member for supporting the heater 32 but also a guide member for guiding the rotation (movement) of the cylindrical fixing film 30. As a material for the heater holder 34, it is possible to suitably use heat-resistant resin materials such as polyimide, polyamideimide, PEEK (polyether ether ketone), PPS (polyphenylene sulfide) and a liquid crystal polymer; composite materials of these resins materials with ceramics, metal, glass and the like, etc. Of these materials, the liquid crystal polymer which has a high heat-resistant temperature, which can be subjected to molding, and which is excellent in dimension stability may particularly suitable be used. In this embodiment, as the material for the heater holder 34, the liquid crystal polymer was used. The liquid crystal polymer has the following advantages. First, the heat-resistant temperature is high and therefore a degree of latitude of a set temperature of the heater can be increased. Further, the liquid crystal polymer can be subjected to the molding and therefore has good productivity, so that the liquid crystal polymer can be mass-manufactured. In addition, the liquid crystal polymer is excellent in dimension stability and therefore an urging force for urging the heater 32 toward the pressing roller 31 surface via the fixing film 30 can be made uniform, so that there is also an advantage that a recording material conveyance performance in the fixing nip described later is stabilized.

The rigid stay 33 has a strength such that it is not largely deformed even by an urging force for urging the heater holder 34 toward the pressing roller 31 side by being formed in a reverse U-like shape in cross section by using a metal material such as iron in order that the rigid stay 33 is not largely deformed even by the urging force for urging the heater holder 34 toward the pressing roller 31 side. The rigid stay 33 is urged toward the pressing roller 31 side by urging the projected portions, at the both end portions of the rigid stay, by urging springs described later.

The fixing film 30 has a thickness of about 50-500 μm in order to efficiently transfer heat to the heater 32 in the fixing nip N. As shown in (b) of FIG. 3, the fixing film 30 includes a cylindrical film base layer 30a which is an innermost layer (hereinafter referred to as a base layer) and a parting layer 30b which is provided over an outer peripheral surface of the base layer 30a and which is an outermost layer.

The inner surface of the base layer 30a provided at an innermost portion of the fixing film 30 contacts the glass coat layer 32c of the heater 32 and the heater holder (film guide) 34. The base layer 30a is excellent in heat resistance and is formed of a flexible material such as polyimide, polyamideimide or PEEK, in a thickness of about 10-100 μm alone.

The fixing film 30 sufficiently follows and intimately contacts the surface of the glass coat layer 32c of the heater 32 and the surface of a downstream projection 34b, described later, of the heater holder 34 in the fixing nip N. For that reason, it is important that the base layer 30a has the flexibility. In order to improve the flexibility, a smaller thickness of the base layer 30a is effective. However, when the thickness of the base layer 30a is extremely decreased, the rigidity of the fixing film 30 is lowered, so that the fixing film 30 is deformed and causes creases therein. In order to prevent this, e.g., in the case where the base layer 30a is formed of polyimide, the thickness is required to be 10 μm or more. Further, this base layer 30a retains a mechanical strength such as a tearing strength of the whole fixing film 30. In this embodiment, as the base layer 30a, a cylindrical polyimide resin material of 50 μm in thickness and 18 μm in inner diameter which are measured by a micrometer.

The parting layer 30b provided at an outermost side of the fixing film 30 is a layer for preventing deposition of the toner on the outer peripheral surface of the base layer 30a and contacts the toner image Ta, the recording material P or a parting layer, described later, of the pressing roller 31. As the parting layer 30b, a fluorine-containing resin material, having a thickness of about 5-70 μm and a good parting property, such as PFA (tetrafluoroethylene perfluoroalkylvinyl ether copolymer), PTFE (polytetrafluoroethylene) or FEP (tetrafluoroethylene hexafluoropropylene copolymer) can be suitably used. In this embodiment, as the parting layer 30b, a 15 μm-thick PFA layer was used.

The pressing roller 31 includes a core metal 31b formed of a metal material, an elastic layer 31a provided on the outer peripheral surface of the core metal 31b, the parting layer 31c provided on the outer peripheral surface of the elastic Layer 31a, and the like. As a material for the elastic layer 31a, a silicone rubber having an elastic property is used. The parting layer 31c is a layer for preventing the toner from being deposited on the outer peripheral surface of the elastic layer 31a. In this embodiment, as the parting layer 31c, the same fluorine-containing resin material as that for the parting layer 30b of the fixing film 30. This pressing roller 31 is provided under the heater assembly unit 50 so as to oppose the heater 32 and the heater holder 34 of the heater assembly unit 50 via the fixing film 30. As shown in FIG. 3, a line Lfc passing through the center of the heater 32 with respect to the widthwise direction is a center line of the heater assembly unit 50, and a line which passes through a rotation center of the pressing roller 31 and which is perpendicular to the surface of the heater substrate 32p is a center line Lpc of the pressing roller 31. Further, the heater assembly unit 50 and the pressing roller 31 are provided so that the center line Lfc is located upstream of the center line Lpc with respect to the recording material conveyance direction, so that the heater and heater holder 34 of the heater assembly unit 50 are opposed to the pressing roller 31. The pressing roller 31 is supported at that position so that longitudinal end portions of the core metal 31b are rotatably supported by a bottom-side casing 41 via bearings 37. The bearings 37 are formed of a material, which has the heat resistance and is excellent in sliding property, in order to rotatably support the core metal 31b which becomes a relatively high temperature.

The heater assembly unit 50 is urged by the urging springs 38, shown in FIG. 1 mounted on the top plate-side casing 39 in a compressed state at the longitudinal end sides, in a direction in which the projected portions 33a of the rigid stay 33 are perpendicular to a generating line direction of the pressing roller 31. As a result, the surface of the glass coat layer 32c of the heater 32 and the surface of the downstream projection 34b which is a bending portion of the heater holder 34 at the recording material conveyance direction downstream side contact the inner surface of the fixing film 30, thereby to urge the fixing film 30 in the direction perpendicular to the generating line direction of the pressing roller 31. By this urging, the surface of the glass coat layer 32c of the heater 32 and the surface of the downstream projection 34b of the heater holder 34 contacting the inner surface of the fixing film 30 urge the pressing roller 31 in the direction perpendicular to the generating line direction of the pressing roller 31 via the fixing film 30. By this urging, the elastic layer 31b of the pressing roller 31 is elastically deformed in the direction perpendicular to the generating line direction of the pressing roller 31, so that the fixing nip N is formed by the fixing film 30 and the pressing roller 31 together with the heater 32 and the heater holder 34. Here, the heater 32 and the heater holder (film guide) 34 constitutes the nip-forming member. Thus, the downstream projection 34b of the heater holder 34 constitutes the supporting portion in the fixing nip N at the recording material conveyance direction downstream side. A place where the fixing film 30 is bent and urged is created by the downstream projection 34b, there is an effect such that curl of the recording material P when the recording material P is discharged is corrected and that glossiness of the image is enhanced by locally applying a high pressure to the surface of the toner image after the fixing. The sliding between the surface of the downstream projection 34b of the heater holder 34 and the inner surface of the fixing film 30 will be described specifically later.

(3) Fixing Operation of Fixing Device 19

The fixing device 19 in this embodiment rotates a driving gear 31d shown in FIG. 1 by rotationally driving a driving motor M shown in FIG. 3 in accordance with a print instruction. As a result, the pressing roller 31 is rotated in an arrow direction shown in FIG. 3 at a predetermined peripheral speed (process speed). The rotation of the pressing roller 31 is transmitted to the surface of the fixing film 30 by a frictional force between the pressing roller 31 surface and the fixing film 30 surface in the fixing nip N. As a result, the fixing film 30 follows the rotation of the pressing roller 31 while contacting the surface of the glass coat layer 32c of the heater 32 and the surface of the downstream projection 34b of the heater holder 34 at its inner surface, thus being rotated in an arrow direction shown in FIG. 3. The inner surface of the fixing film 30 and the surface of the glass coat layer 32c of the heater 32, and the inner surface of the fixing film 30 and the surface of the downstream projection 34b of the heater holder 34 slide in an urged state, respectively. Therefore, in order to alleviate their sliding resistances, unshown grease is applied, as the lubricant, onto the surface of the glass coat layer 32c of the heater 32 contacting the inner surface of the fixing film 30. The grease is prepared by using, as a base material, a fluorine-containing oil as a liquid lubricant and by mixing and dispersing a fluorine-containing resin material as a solid lubricant in the fluorine-containing oil. In this way, the lubricant is interposed between the inner surface of the fixing film 30 and the glass coat layer 30c of the heater 32, so that a good sliding property can be maintained even by long-term use of the fixing device. In this embodiment, a length of the pressing roller 31 is made shorter than that of the fixing film 30 by about 10 mm, so that the grease squeezed out of a film end portion of the fixing film 30 is prevented from adhering to the pressing roller 31 surface. When the grease adheres to the pressing roller 31 surface, grip of the fixing film 30 surface by the pressing roller 31 surface is lost, so that the pressing roller 31 slips on the fixing film 30. In this embodiment, as described above, the length of the pressing roller 31 is made shorter than that of the fixing film 30, so that the slip of the pressing roller 31 on the fixing film 30 is prevented.

Further, the fixing device 19 in this embodiment turns on a triac (not shown) as an energization controller in accordance with the print instruction. Then, the triac starts energization to the energization heat generating resistors 32b of the heater 32 via an energy supplying connector 35. As a result, the energization heat generating resistor generates heat, so that the heater is quickly increased in temperature to heat the fixing film 30 in the order of the base layer 30a and the parting layer 30b. The temperature of this heater 32 is detected by the thermistor 41, and temperature information outputted from the thermistor 41 is incorporated by CPU (not shown). The CPU effects, on the basis of the temperature information from the thermistor 41 electric power drive control, such as phase control or wave number control of an AC voltage by the triac, thus controlling an amount of energization to the heater 32 so that the temperature information of the heater by the thermistor 41 becomes substantially constant. As a result, the temperature of the heater 32 is kept at a predetermined fixing temperature (target temperature) for permitting heat fixation of the unfixed toner image Ta, on the recording material P, carried on the recording material P.

When the pressing roller 31 is rotated and the temperature of the heater 32 is kept at the predetermined fixing temperature, the recording material P is introduced into the fixing nip N with a toner image carrying surface of the recording material P contacts the fixing film 30. This recording material P is nipped between the fixing film 30 surface and the pressing roller 31 surface in the fixing nip N and is conveyed in that state (nip-conveyed). Further, during this conveyance process, by subjecting the toner image Ta to heat of the fixing film 30 and pressure of the fixing nip N, the toner image Ta is heat-fixed on the recording material P. The recording material P on which the toner image Ta is heat-fixed is separated from the fixing film 30 surface and then is discharged from the fixing nip predetermined N.

(4) Roughening of Inner Surface of Fixing Film 30

The inner surface of the fixing film 30, i.e., the inner surface of the base layer 30a contacts the glass coat layer 32c of the heater 32 to slide on the glass coat layer 32c. In order to lower this sliding resistance, the grease as the lubricant is applied onto the glass coat layer 32c surface (the heater 32 surface). For the purpose of holding this grease, the inner surface of the base layer 30a is subjected to roughening. Further, by subjecting the inner surface of the base layer 30a to the roughening, a contact area between the fixing film 30 and the heater 32 can be reduced, so that a frictional resistance between the fixing film 30 and the heater 32 can be alleviated. As a result, an occurrence of stick-slip between the heater 32 surface and the fixing film 30 surface can be suppressed.

The roughened inner surface of the base layer 30a may preferably have a surface roughness to the extent such that particles of a solid matter of the grease enter recesses and projections provided by the roughening. This is because the fluorine-containing oil is not readily depleted. The solid matter contained in the grease retains the fluorine-containing oil at its surface. For that reason, with a larger specific surface area of the solid matter contained in the grease, an oil component-retaining performance is more enhanced. Therefore, in order to effectively retaining the grease, it is preferable that the recesses and projections to the extent such that particles of the solid matter are engaged therewith are provided at the inner surface of the base layer 30a. A secondary agglomeration particle size of fluorine-containing resin powder as the solid matter of the grease may suitably be about 2 µm. When the secondary agglomeration particle size is excessively small, power of retaining the oil component for a long term is undesirably lowered. In order to ensure the particle size with which the above-described solid matter of the grease can be accommodated in the recesses and projections at the inner surface of the base layer 30a, the inner surface of the base layer 30a may preferably be roughened so as to satisfy Rzjis>2 µm. Further, the inner surface of the base layer 30a is abraded in a thickness of about several µm by sliding between the inner surface of the base layer 30a and the glass coat layer 32c in some cases. It would be considered that the recesses and projections of the inner surface of the base layer 30a are smoothened by this abrasion and thus the grease-retaining performance is lowered. Therefore, the inner surface of the base layer 30a may more preferably be roughened to satisfy Rzjis≥3 µm.

(5) Manufacturing Method of Base Layer 30a of Fixing Film 30

As a comparative embodiment, the case where the base layer is formed with a polyimide resin material will be described. As a manufacturing method of the base layer, a method in which a polyimide precursor liquid is cast-molded outside a cylindrical seamless metal mold subjected to surface roughening and then is polymerized to provide the polyimide resin material is used. By roughening the outer surface of the metal mold, to be used, in advance, it is possible to roughen the inner surface of the cylindrical seamless tubular product of the polyimide resin material as the base layer 30a. As a method of roughening the outer surface of the metal mold to be used, sand blasting is simple and is commonly used.

However, in the case where the sand blasting is used, the inner surface of the cylindrical seamless polyimide resin material molded as the base layer (hereinafter referred also to as a polyimide tubular product) has a profile such that there are many sharp portions. It was turned out as a result of study by the present inventors that there is a problem such that a sliding noise is increased by the sliding between the sharp portions of the inner surface of the base layer and the surface of the downstream projection 34b of the heater holder (film guide).

In the case where the base layer inner surface is roughened by the sand blasting, it is assumed that the sharp portions are increased at the base layer inner surface based on the following mechanism. The sand blasting described herein is a processing method in which sharp-shaped particles as the lubricant are collided against the surface of the metal mold (surface to be roughened) at a high speed. When the surface of the metal mold is roughened to some extent by the sand blasting to form the recesses and projections and then the processing is further continued, the projections have a high frequency of contact with the particles and therefore are abraded to remove sharp edges, thus being rounded at their ends. On the other hand, the recesses of the metal mold surface have a low frequency of contact with the particles and therefore result in a shape which is sharper than that of the above-described projections. Therefore, a roughness curve of the base layer inner surface of the polyimide resin material manufactured by the above-described method tends to have a profile such that the projections are sharper than the recesses since the above-described metal mold surface shape is transferred onto the base layer inner surface.

Incidentally, when the base layer inner surface roughened by the above-described method is formed, the tendency that the sharp projections are liable to be formed at the inner surface of the base layer is not limited to the polyimide resin material used in this embodiment but is also true for polyamideimide and PEEK.

Here, in the case where the base layer inner surface roughened by the above-described method is formed, when the surface roughness of the base layer inner surface is measured on the basis of JIS (Japanese Industrial Standards) B0601, skewness Rsk of a roughness curve is liable to satisfy Rsk>0. The skewness Rsk is an index indicating bias of the roughness curve with respect to a center line and is represented by the following equation.

$$Rsk = \frac{1}{Rq^3}\left[\frac{1}{lr}\int_0^{lr} z^3(x)\,dx\right]$$

In the above equation, Z(x) represents the roughness curve, Rq represents a root-mean-square roughness and lr represents a reference length (JIS B0601). In the case of Rsk<0, a heightens distribution is localized at an upper side with respected to the center line. In the case of Rsk>0, the height distribution is localized at a lower side with respect to the center line.

Therefore, when the profile is, as in the case of the above-described roughed inner surface of the base layer, such that the ends of the projections are sharper than those (bottoms) of the recesses, the skewness Rsk tends to satisfy Rsk>0. On the other hand, when the profile is such that the ends of the projections of the roughened inner surface of the base layer are rounder than the neighborhood of the bottoms of the recesses, the slid Rsk tends to satisfy Rsk>0. Further, in the case where the profile is such that the ends of the projections and the bottoms of the recesses of the roughened inner surface of the base layer are similarly round, the skewness Rsk tends to be Rsk>0 with a higher density of the projections and tends to be Rsk>0 with a lower density of the projections.

Part (a) of FIG. 4 is a schematic view showing a cross section of the surface of the downstream projection 34a of the heater holder 34 and the inner surface of a base layer 80a of a fixing film 80 having the surface roughness satisfying Rsk>0 on the comparative embodiment. As shown in (a) of FIG. 4, the inner surface of the base layer 80a having the surface roughness satisfying Rsk>0 has the profile such that the ends of the projections are sharper than the bottoms of the recesses. On the other hand, (b) of FIG. 4 is a schematic view showing a cross section of the surface of the downstream projection 34a of the heater holder 34 and the inner surface of the base layer 30a of a fixing film 30 having the surface roughness satisfying Rsk<0 on this embodiment (of the present invention). As shown in (b) of FIG. 4, the inner surface of the base layer 30a having the surface roughness satisfying Rsk M 0 has the profile such that the ends of the projections are rounder than the bottoms of the recesses. Incidentally, (a) and (b) of FIG. 4, the average roughness Rzjis of the downstream projection of the heater holder 34 satisfies Rzjis>2 μm in order to retain the grease.

Here, a mechanism of an occurrence of the sliding noise recognized as a noise when the inner surface of the fixing film 80 in the comparative embodiment (Rsk>0) and the downstream projection of the heater holder 34 slide on each other will be described.

The projections of the roughed inner surface of the base layer 80a in the comparative embodiment have the sharp ends as shown by P11, P12, P13 and P14 in (a) of FIG. 4, and the sharp ends are liable to have small rigidity. Therefore, the projections of the inner surface of the fixing film 80 in the comparative embodiment are, when the projections slide with the downstream projection of the heater holder 34, displaced by falling in the movement direction of the fixing film 80 and in an opposite direction and by restoration to original positions. The displacement of the projections of the base layer 80a at this time causes vibration of the fixing film 80 in the thickness direction of the fixing film 80 with a large amplitude at a high frequency. This sound due to the vibration is a high-pitched sound in many cases, so that the sliding sound (sliding noise) is liable to be recognized as the noise. Specifically, the above sliding noise is liable to become the second (noise) with a frequency of about 3000 Hz which is liable to be recognized as the noise with respect to human audibility.

Particularly, when the recording material is conveyed in the fixing nip N, the vibration of the fixing film 80 at the high frequency is transmitted to the recording material which intimately contacts the fixing film 80 surface in some cases. At this time, the recording material performs the function like cone paper of a speaker, so that the vibration thereof a transmitted to the whole recording material to result in a large sliding noise in some cases.

By the mechanism as described above, the sliding noise which is liable to be recognized as the noise occurs when the base layer 80a of the fixing film 80 in the comparative embodiment and the downstream projection of the heater holder 34 slide with each other.

Next, a mechanism of less occurrence of the sliding noise recognized as a noise when the inner surface of the fixing film 30 in this embodiment (of the present invention) (Rsk<0) and the downstream projection of the heater holder 34 slide on each other will be described.

At the inner surface of the base layer 30a in this embodiment (of the present invention) as shown by P15, P16, P17 and P18 in (b) of FIG. 4, the profile is such that the ends of the projections are rounder than the bottoms of the recesses, and the rigidity of the projections is higher than that in the above-described comparative embodiment. Therefore, the amount of displacement of the projections at the inner surface of the base layer 30a in this embodiment becomes small, so that an amplitude of the vibration of the fixing film 30 in the thickness direction of the fixing film 30 becomes small and thus sound pressure becomes small. Therefore, the sliding sound is reduced and does not readily result in the sliding noise to the extent that it is recognized as the noise.

Further, with respect to the roughened inner surface of the base layer 30a, the projections of the inner surface satisfying Rsk<0 has a density higher than that of the projections of the inner surface satisfying Rsk>0. With a higher density of the projections of the inner surface of the base layer 30a, the pressure applied per one of the projections in the nip is decreased and thus the projections are not readily displaced and therefore the sliding noise is alleviated.

Next, a manufacturing method of the fixing film 30 having the roughened inner surface so as to satisfy Rsk<0 as in this embodiment will be described.

There is a method in which at first, the fixing film having the inner surface of the base layer 30a satisfying Rsk>0 is manufactured and then the inner surface of the base layer 30a is roughened by post-processing so as to satisfy Rsk<0. Specifically, the method is such that the roughened inner surface of the base layer satisfying Rsk>0 is uniformly ground by micro-grinder.

When the grinding of the base layer inner surface by the micro-grinder is continued, the ends of the sharp projections of the base layer inner surface are abraded and rounded and therefore a value of the Rsk is gradually decreased, so that a roughened surface portion satisfying Rsk<0 can be formed.

However, when a grinding time of the base layer inner surface by the micro-grinder is prolonged, the average roughness Rzjis is also decreased and therefore the average roughness Rzjis may preferably be made larger than a target value in advance.

Next, a method of manufacturing the fixing film having the inner surface roughened so as to satisfy Rsk<0 without effecting the post-processing will be described. The method is such that the surface of the metal mold is roughened so as to satisfy Rsk<0 in advance and then the base layer is molded so that the roughened surface of the metal mold is transferred onto the base layer inner surface to manufacture the fixing film. In the case where the surface of the metal mold satisfies Rsk>0, the base layer surface molded by transferring the surface of the metal mold can be made to satisfy Rsk<0.

As a method of roughening the surface of the metal mold so as to satisfy Rsk>0, there is a method in which the surface of a cylindrical metal mold is subjected to mirror-like finishing and then is subjected to dimpling to be provided with semi-spherical depressions. Incidentally, as other methods of roughening the surface of the metal mold so as to satisfy Rsk>0, there are embossing, knurling, etching and the like. As a material for the metal mold, metal, glass, high-heat-resistant plastic and the like are used.

The polyimide resin material is cast-molded in the cylindrical metal mold subjected to the surface roughening in advance by the above-described method and undergoes imide inversion and thereafter a primer layer and a parting layer are formed to manufacture the fixing film. The imide inversion progresses together with evaporation of N-methyl-2-pyrrolidone (NMP) by heating a polyimide precursor on the metal mold surface at 80-120° C. for about 60 minutes. Then, as primary imide inversion, heating at a temperature of about 200° C. for about 20 minutes is effected, so that a partly cured polyimide tubular product. In this state, in a vessel containing a primer, the polyimide tubular product is dipped while being integrated with the metal mold, so that the primer is coated in a predetermined thickness and is heated. Thereafter, the fluorine-containing layer as the outermost layer is coated by dipping or the like and is dried at a temperature of about 250° C. and thereafter at a temperature of 300-380° C., baking of the fluorine-containing layer and the imide inversion reaction of the polyimide resin material can be completed. Thereafter, the resultant structure is cooled and then the polyimide tubular product as a flexible resin material is separated from the metal mold, so that the fixing film can be obtained.

Thus, by the method of manufacturing the fixing film by using, as the base layer 30a, the tubular product of the flexible resin material molded by transferring the metal mold surface satisfying Rsk>0, it is possible to manufacture the fixing film having the roughened inner surface with a stabler quality.

(6) Measuring Experiment Result of Sliding Noise of Fixing Film

As result of a measuring experiment of the sliding noise (sliding sound) of fixing films in Embodiments and Comparative Embodiments conducted in order to confirm the effect of the fixing film 30 in this embodiment will be described with reference to FIG. 5.

FIG. 5 shows a result of sound pressure of the sliding noise and a magnitude of the noise (sound) in the neighborhood of 3000 Hz when each of fixing devices using fixing films having base layers for which inner surfaces have changed values of the skewness Rsk and the average roughness Rzjis is mounted in the printer and then the recording material is passed through the fixing device.

Comparative Embodiments 1-4 in FIG. 5 show a measurement result of the fixing devices having the base layer inner surfaces roughened so as to satisfy Rsk>0. Embodiments 1-7 show a measurement result of the fixing devices using the fixing films having the base layer inner surfaces roughened so as to satisfy Rsk<0. Further, in Comparative Embodiments 1-4 and Embodiments 1-7, constituent members other than the fixing films are the same.

Incidentally, in Comparative Embodiments 1-4 and Embodiments 1-7, the values of the average roughness Rzjis and the skewness Rsk were adjusted so as to become those shown in FIG. 5 by changing the grinding time of each base layer inner surface by the micro-grinder.

For measurement of the surface roughness, a contact surface roughness meter ("Surfcoder SE-3300", mfd. by Kosaka Laboratory Ltd.). A measuring condition is 0.8 mm in cut of value, 2.5 mm in measuring length, 0.1 mm/sec in feeding speed and 5000 times in magnification. The surface roughness is the average roughness Rzjis measured according to JIS B0601.

The measurement was made in a measuring length of 2.5 mm with respect to the rotational direction of each fixing film at 8 measuring points of the surface roughness in total including 4 points of an inner peripheral surface of each fixing film (base layer inner surface) with respect to the generating line direction and including 2 points for each of the 4 points with respect to the rotational direction of each fixing film. Further, an average of values of the average roughness at the 8 points and an average of values of the skewness Rsk at the 8 points were taken as Rzjis and Rsk in FIG. 5, respectively.

Each of the fixing devices constituted by using the fixing films in Embodiments 1-7 and Comparative Embodiments 1-4 was incorporated into a laser printer ("HP Laser Jet Pro CP1525nw", mfd. by Hewlett-Packard Japan, Ltd.) and then was subjected to a printing test. The printing test was conducted by stacking 100 sheets of paper of Business 4200 (Xerox Corporation) in a cassette and then by continuous printing on 100 sheets of blank gages in a monochromatic mode.

A measuring method of the sliding noise of the fixing films in Embodiments 1-7 and Comparative Embodiments 1-4 is described below. The above-described printer is placed in an anechoic chamber of 30 dB in background noise, and a noise meter ("NL-02", mfd. by RION Co., Ltd.) is placed at position corresponding to 50 cm vertically above from a sheet discharge tray at an upper surface of the printer. The sound pressure (dB) when the recording material is conveyed in the nip of the fixing device and opposes the noise meter was measured. Further, a microphone is placed at a position close to the noise meter, and the measuring result of the noise was analyzed by Fast Fourier Transform Analyzer. In the case where the sliding noise is annoying with respect to audibility, it was found that the sliding noise is distributed dominantly at about 3000 Hz as a frequency. In the case where the measured sound pressure at about 300 Hz in FIG. 5 is "SMALL", the sliding noise is not particularly annoying and is of a level such that the sliding noise is not recognized as the noise. In the case of "LARGE", the sliding noise is noisy and is of a level such that the sliding noise is recognized as the noise.

In summary of the above experiment result, each of the fixing devices using the fixing films satisfying Rsk<0 in Embodiments 1-7 provided a small sound pressure of the sliding noise irrespective of the average roughness Rzjis and was of the level such that the sliding noise was not recognized as the noise, thus providing a good result. On the other hand, each of the fixing devices using the fixing films satisfying Rsk>0 in Comparative Embodiments 1-4 provided the sliding noise sound pressure larger than those in Embodiments 1-7 irrespective of the average roughness Rzjis and was of the level such that the sliding noise was recognized as the noise.

Therefore, by using the fixing film 30 including the base layer 30a having the inner surface roughened so as to satisfy Rsk<0 as in this embodiment, an effect of reducing the sliding noise generated when the inner surface of the fixing film (base layer inner surface) and the heater holder 34 slide with each other is achieved.

Here, a lower limit value of Rsk will be described. With a smaller Rsk, the density of the projections of the roughed inner surface of the base layer is increased and the recesses are decreased and therefore the base layer inner surface approaches a flat surface. When the average roughness of the base layer inner surface satisfies Rsk<−3, shuddering noise due to the stick-slip can occur when the fixing film inner surface and the heater holder 34 slide with each other.

Therefore, in order to realize the surface roughness of the fixing film inner surface such that not only the stick-slip but also the sliding noise are generated, the fixing film inner surface may be roughened so as to satisfy −3<Rsk<0.

Incidentally, when the fixing device or the printer in which the fixing device is mounted satisfies Rsk<0 at the fixing film inner surface (base layer inner surface) from a brand-new state, the fixing device or the printer can obtain the effect of reducing the fixing film sliding noise from the brand-new state. Herein, the brand-new state refers to a state at the time when a user taken out the fixing device or the printer from a packing material.

Further, the fixing film 30 described in this embodiment is applicable without being limited to the constitution of the fixing device in this embodiment. For example, the fixing film 30 is also applicable to a fixing device having a constitution including a heater, incorporated in the fixing film 30, for heating the inner surface of the fixing film 30 by radiant heat, the nip-forming member contacting the inner surface of the fixing film 30 and the pressing member for forming the nip between itself and the fixing film 30 together with the nip-forming member. In the case of the fixing device having this constitution, by using the fixing film 30 in this embodiment, there is the effect such that the sliding noise between the nip-forming member and the inner surface of the fixing film 30 can be reduced.

(7) Constitution for Permitting Further Reduction of Sliding Noise

As a constitution for permitting further reduction of the sliding noise, there is a constitution such that a layer for performing the function of vibration damping is provided between the roughened inner surface of the fixing film base layer and the recording sheet which amplifies the vibration. As a result, transmission of the vibration from the fixing film, which is a vibration source, to the recording sheet is suppressed, so that the sliding noise of the fixing film 30 can be reduced. Specifically, as shown in (b) of FIG. 3, a rubber layer 30c is interposed between the base layer 30a as the innermost layer of the fixing film 30 and the parting layer 30b as the outermost layer. As a material for the rubber layer 30c, a material which has a small coefficient of restitution and is excellent in vibration damping property is suitable and, e.g., a silicone rubber material of about 10-500 μm in thickness can be used.

Further, as another method for permitting the further reduction of the sliding noise, there is also a method such that the surface roughness of the heater holder (film guide) 34 which slides with the fixing film 30 is adjusted. When the average roughness Rzjis of the sliding surface of the heater holder 34 is large, there is a possibility that the inner surface projections of the base layer 30a of the fixing film 30 is liable to be displaced, when the heater holder 34 and the fixing film 30 slide with each other, to result in a large sliding noise. Therefore, the average roughness Rzjis of the heater holder 34 may desirably be adjusted to satisfy Rzjis≤10 μm.

The adjustment of the surface roughness of the heater holder 34 can be made by changing a molding condition of the heater holder 34. A transferability when a processing surface, of the metal mold for the molding of the heater holder 34, subjected to mirror finishing is transferred onto the surface of the heater holder 34 is adjusted. The transferability is improved by increasing the pressure or the metal mold temperature during the molding of the heater holder.

Further, as the material for the heater holder 34 in this embodiment, the liquid crystal polymer is used but the magnitude of Rzjis can also be adjusted by changing a formulation of resin materials for the liquid crystal polymer. Specifically, a reinforcing filler such as a glass fiber is reduced in amount, so that the surface, having the average roughness Rzjis, close to the mirror surface can be obtained. However, in the resin molding, cracking is liable to occur at a weld portion which generates at a portion where flows of the melted resin material merge to cause welding. In order to avoid the cracking at this weld portion, the glass fiber may preferably be mixed in an appropriate amount.

Therefore, from the viewpoints that the heater holder 34 is not readily cracked when the glass fiber is mixed in the appropriate amount and that the grease is retained, the surface at which the heater holder 34 slides with the fixing film 30 is made to have Rzjis satisfying Rzjis≥2 μm. In a base resin material of the heater holder 34, not only the glass fiber but also hollow glass bubbles (hollow spherical members) are mixed. As a result, also in the case where the surface of the heater holder 34 is abraded in durable use, not only the sharp glass fiber but also the above-described spherical members of the glass bubbles are exposed to the surface of the heater holder 34. As a result, the effect of suppressing the vibration of the fixing film 30 occurring when the heater holder 34 and the base layer inner surface of the fixing film 30 slide with each other is achieved.

When the above-described glass bubbles are broken during the molding of the heater holder 34, the inner surface projections of the fixing film base layer 30a are abraded by the glass bubbles broken to have a sharp shape and therefore it is important that the glass bubbles are not broken to the extent possible during the molding of the heater holder 34. For this reason, as the hollow spherical member, a material, such as glass bubbles or Shirasu baloon, which is less liable to be deformed even at a resin temperature close to 400° C. during the molding of the liquid crystal polymer may preferably be used. Further, the glass bubbles (hollow spherical member) may preferably have a diameter of 10 μm or less so as to withstand even an ejection pressure during the molding. Further, the diameter of the glass bubbles may preferably be 1 μm or more since there is a possibility that the inner surface projections of the base layer 30a of the fixing film 30 are abraded when the diameter is excessively small.

As described above, in the base resin material for the resin material for forming the heater holder 34, the glass bubbles (hollow spherical member) having the diameter of 1 μm or more and 10 μm or less are dispersed. As a result, it is possible to reduce the sliding noise when the fixing film 30 slides with the heater holder 34.

Another Embodiment

The fixing device in the above-described embodiment is not limited to use as the fixing device for heat-fixing the unfixed toner image on the recording material. For example, the fixing device can also be used as an image heating apparatus for temporarily fixing the unfixed toner image on the recording material or an image heating apparatus for increasing glossiness of a toner image surface by heating the toner image heat-fixed on the recording material.

While the invention has been described with reference to the structures disclosed herein, it is not confined to the details set forth and this application is intended to cover such modifications or changes as may come within the purpose of the improvements or the scope of the following claims.

This application claims priority from Japanese Patent Applications Nos. 048671/2011 filed Mar. 7, 2011 and 037701/2012 filed Feb. 23, 2012, which are hereby incorporated by reference.

What is claimed is:

1. An image heating apparatus for heating, in a nip, a recording material for carrying a toner image while conveying the recording material, the image heating apparatus comprising:
   a cylindrical film including a resin layer which is an innermost layer of the film;
   a pressing member contacting an outer surface of the film; and
   a nip-forming member formed of a resin, the nip-forming member contacting the resin layer and forming the nip portion with the pressing member via the film,
   wherein the inner surface of the resin layer is provided with a roughened surface portion in a region in which the nip-forming member is in contact with the resin layer, and
   wherein the roughened surface portion has a skewness Rsk satisfying: Rsk<0.

2. An image heating apparatus according to claim 1, wherein the roughened surface portion has an average roughness Rzjis satisfying: Rzjis≥2 μm.

3. An image heating apparatus according to claim 1, wherein the skewness Rsk of the roughened surface portion satisfies: Rsk>−3.

4. An image heating apparatus according to claim 1, further comprising a heater, forming the nip portion with the pressing member via the film, configured to heat the film by contacting the resin layer.

5. An image heating apparatus according to claim 1, wherein the nip-forming member is a film guide configured to guide rotation of the film.

6. An image heating apparatus according to claim 1 wherein a lubricant is applied onto a region in which the nip-forming member is in contact with the roughened surface portion.

7. An image heating apparatus according to claim 1 wherein an average roughness Rzjis in a region in which a surface of the nip-forming member is in contact with the film to form the nip satisfies: 2 μm≤Rzjis≤10 μm.

8. An image heating apparatus according to claim 1 wherein the resin layer is formed of polyimide, polyamide-imide or polyether ether ketone.

9. A cylindrical film used for an image heating apparatus for heating a recording material on which a toner image is carried, the film comprising:
a resin layer which is an innermost layer of the film,
wherein a roughened surface portion is provided at the resin layer having a skewness Rsk satisfying: Rsk<0.

10. An image heating apparatus according to claim 9 wherein the resin layer is formed of polyimide, polyamide-imide or polyether ether ketone.

11. An image heating apparatus for heating, in a nip portion, a recording material for carrying a toner image while conveying the recording material, said image heating apparatus comprising:
a film assembly unit comprising a cylindrical film and a nip-forming member contacting an inner surface of the film; and
a pressing member configured to form the nip portion with the nip-forming member via the film,
wherein the film assembly unit and the pressing member are provided so that a center of the film assembly unit is located upstream of a center of the pressing member in a conveyance direction of the recording material,
wherein the inner surface of the film is provided with a roughened surface portion in a region in which the nip-forming member is in contact with the inner surface of the film, and
wherein the roughened surface portion has a skewness Rsk satisfying: Rsk<0.

12. An image heating apparatus according to claim 11, wherein the nip-forming member has a projection projected toward the pressing member at a downstream side of the nip portion in a conveyance direction of the recording material.

13. An image heating apparatus according to claim 11, wherein the skewness Rsk of the roughened surface portion satisfies: Rsk>−3.

14. An image heating apparatus according to claim 11, wherein the film includes a resin layer which is an innermost layer of the film, and
wherein the roughened surface portion is provided at the resin layer.

15. An image heating apparatus according to claim 14, wherein the resin layer is formed of polyimide, polyamide-imide or polyether ether ketone.

* * * * *